July 4, 1933. E. TYDEN 1,917,000
VALVE
Filed June 30, 1930
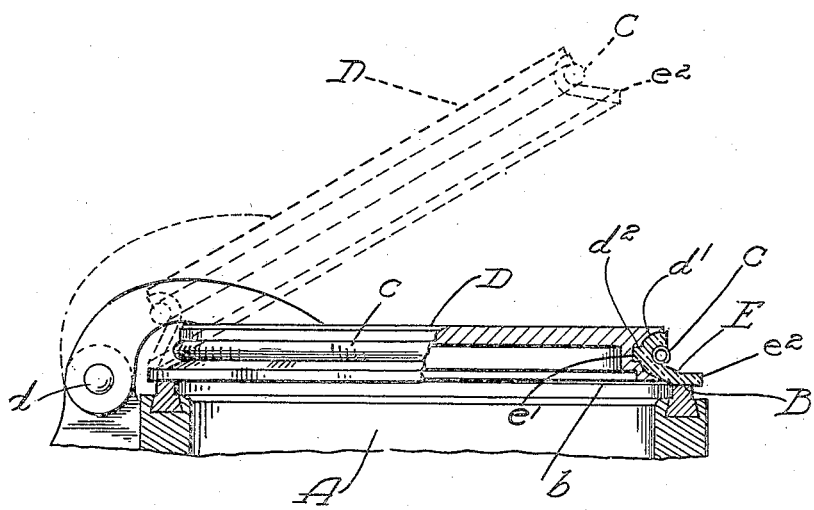
Inventor  
Emil Tyden.  
by Burton Burton  
his Attorneys.

Patented July 4, 1933

1,917,000

UNITED STATES PATENT OFFICE

EMIL TYDEN, OF HASTINGS, MICHIGAN

VALVE

Application filed June 30, 1930. Serial No. 464,944.

The purpose of this invention is to provide a valve of the type arranged for seating on a flat annular seat, which shall have a seating member adapted to accommodate itself automatically to minor irregularities in the valve seat and to minor inaccuracy in respect to the coincidence of the plane of the seat and the plane of the seating face of the valve, so as to ensure perfect sealing of the port controlled by the valve. It consists in the elements and features of construction shown and described as indicated in the claims.

In the drawing:

The figure is a vertical diametric section of a valve construction embodying this invention, the valve being shown in full lines in seated position and in dotted lines in open position with respect to the seat.

Referring to the drawing in detail:

A represents the discharge portion of a conduit for liquid which is to be controlled by a flapper valve. B represents the valve seat having the flat seating face, as seen at $b$. D represents the body of the valve hinged to the conduit, A, at one side of the discharge port, as indicated at $d$. This valve body member is formed with a peripheral groove, $d^1$, approximately semi-circular in radial section of said valve body, with an abrupt shouldered recess at the bottom of the semi-circular groove indicated at $d^2$, said recess also preferably encompassing the body member.

E represents a seating member of the valve which may be understood to be made of resiliently flexible material, as rubber, and molded or otherwise formed as a closed ring dimensioned as to diameter and radial cross section, for encompassing the body member, D, and occupying the peripheral groove, $d^1$, when stressed radially into said groove by the extraneous means hereinafter mentioned, or by its own resilient reaction from the stretching and circumferential elongation necessary to introduce it to said encompassing position. The width of this seating member exceeds the width necessary to occupy the peripheral groove of the body member, by an amount for forming a seating lip, as indicated at $e^2$, this excess portion of the width protruding radially with respect to the body member, D, normally in a direction approximately tangential to the curvilinear outline in section radial with respect to the valve, of the peripheral groove. At proper place in the width the ring E, has an abrupt shouldered bead, $e^1$, for engaging the recess, $d^2$.

The resilient flexibility of said seating member at said protruding portion adapts it to be flexed into perfect seating position on the valve seat, $b$, when the valve is swung about its pivot to seating position. For retaining the seating member, E, securely in the peripheral groove of the body member, D, there is provided a tensionally resilient ring, C, of normal diameter requiring it to be substantially stretched in order to introduce it over the periphery of the valve body into position encompassing said valve body in a plane parallel to the plane of seating of the valve and substantially radial with respect to the semi-circular curvilinear outline of the groove, $d^1$, the tensional resiliency of the ring being sufficient to enable it to flex the seating member, E, snugly into the semi-circular body-encompassing groove, and thereby force and hold the bead, $e^1$, of said seating member into the recess, $d^2$, of the body.

Upon considering the construction as above described, it may be seen that it constitutes a clapper or flapper valve with a resilient seating lip firmly held to the rigid body member of the valve so as not to be liable to displacement in pressing the valve to its seat forcibly enough to ensure the perfect sealing of the port at the lodgement of the lip on the valve seat against the liquid discharge pressure which it is the function of the valve to control. And it will be recognized that the construction is adapted to facilitate removal and replacement of the seating member when the latter becomes worn or deficient in resiliency for effective service.

I claim:

1. A valve consisting of a rigid body member having a peripheral encompassing groove of substantial depth radially of said body member forming a radially extended flange of the body member at the seating side of said body member; a ring of resiliently flexible material dimensioned as to diameter for snugly peripherally encompassing the body member at the zone of said groove, and as to width exceeding the width of the groove, plus the dimension of said flange axially of the valve body member by an amount sufficient to form a seating face of the valve; a flexible element encompassing said seating member at the zone of the groove and stressed thereabout, the said seating member being pressed by said flexible element into the groove with said excess width protruding radially from the periphery of the body member about the entire circumference thereof, whereby said flexible resilient ring constitutes a resiliently flexible seating member of the valve.

2. A valve consisting of a rigid body member having a peripheral groove and a seating member consisting of a resiliently flexible ring formed for seating as to a portion of its width in said peripheral groove with the remainder of its width protruding radially in the general direction of the plane of the circumferential edge of the body at the seating side of the valve, and a tensionally resilient ring encompassing the seating member in the plane of the groove for stressing said seating member into said groove, the body member having at the bottom of the groove an abrupt-shouldered recess extending throughout the circumference of said body member, and the seating member being formed at the corresponding part of its width which is seated in the groove with a correspondingly abrupt-shouldered bead for engaging said recess to check the seating member transversely against lateral displacement.

3. A clapper valve for seating on a flat annular seat comprising a rigid body member and a seating member consisting of a substantially cylindrical element of flexibly resilient material radially dimensioned for peripherally encompassing the body member and of width for protruding from the face of the body member to form a flexible seating lip, the body member having a peripherally encompassing abrupt-shouldered recess at the plane of which, transaxial with respect to the valve body, the latter is encompassed by the seating member, said seating member having at the part of its width which is seated on the periphery of the body member an inwardly projecting bead formed for engaging said abrupt-shouldered recess, the body having a peripheral groove of substantial depth and curvilinear outline in cross section of the body, the recess being formed at the bottom of said groove, the seating member being adapted to be flexed transversely at the part which encompasses the body member for occupying the groove and intruding the bead of the encompassing member into the peripheral recess of the body, and a tensionally resilient ring encompassing the body and the body-encompassing part of the seating member flexing and stressing the latter into said peripheral groove of the body and stressing the bead into the peripheral recess of the body.

EMIL TYDEN.